United States Patent
Luo et al.

(10) Patent No.: US 9,392,602 B2
(45) Date of Patent: Jul. 12, 2016

(54) METHOD AND DEVICE FOR ADJUSTING CARRIER FREQUENCY OF MULTIPLE-INPUT MULTIPLE OUTPUT MICROWAVE DEVICE

(71) Applicant: HUAWEI TECHNOLOGIES CO., LTD., Shenzhen, Guangdong (CN)

(72) Inventors: Yanxing Luo, Chengdu (CN); Zhuo Zeng, Chengdu (CN); Wenlong Lv, Shenzhen (CN); Yu Liu, Chengdu (CN); Min Yan, Chengdu (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 59 days.

(21) Appl. No.: 14/583,383

(22) Filed: Dec. 26, 2014

(65) Prior Publication Data
US 2015/0110214 A1    Apr. 23, 2015

Related U.S. Application Data

(63) Continuation of application No. PCT/CN2012/077987, filed on Jun. 30, 2012.

(51) Int. Cl.
*H04W 72/04* (2009.01)
*H04W 88/08* (2009.01)
*H04B 7/04* (2006.01)
(Continued)

(52) U.S. Cl.
CPC .......... *H04W 72/0453* (2013.01); *H04B 7/0413* (2013.01); *H04L 7/033* (2013.01); *H04W 56/00* (2013.01); *H04W 88/085* (2013.01); *H04L 2027/0016* (2013.01)

(58) Field of Classification Search
USPC ............... 375/340; 455/118, 207, 9, 3.02
See application file for complete search history.

(56) References Cited

U.S. PATENT DOCUMENTS

| 7,383,018 B2 * | 6/2008 | Knutson et al. ............ 455/3.02 |
| 2004/0176045 A1 | 9/2004 | Lillie |

(Continued)

FOREIGN PATENT DOCUMENTS

| CN | 1605156 | 4/2005 |
| CN | 1647403 | 7/2005 |

(Continued)

OTHER PUBLICATIONS

International Search Report mailed Apr. 4, 2013 in corresponding international application PCT/CN2012/077987.

(Continued)

*Primary Examiner* — Eva Puente
(74) *Attorney, Agent, or Firm* — Staas & Halsey LLP (57) ABSTRACT

The present invention provides a method and a device for adjusting a carrier frequency of a multiple-input multiple-output microwave device. The method includes: obtaining, by an indoor unit IDU, a frequency of a radio frequency-reference crystal oscillator and a first frequency multiplication factor of each outdoor unit ODU; selecting, by the indoor unit IDU, one of the frequencies of the radio frequency-reference crystal oscillator as a reference frequency; adjusting, by the indoor unit IDU, a carrier frequency of the multiple-input multiple-output microwave device according to the first frequency multiplication factor and a radio frequency offset between the reference frequency and the frequency of the radio frequency-reference crystal oscillator of each ODU.

9 Claims, 6 Drawing Sheets

(51) Int. Cl.
   *H04L 7/033*    (2006.01)
   *H04W 56/00*    (2009.01)
   *H04L 27/00*    (2006.01)

(56) References Cited

U.S. PATENT DOCUMENTS

| | | |
|---|---|---|
| 2005/0176377 A1 | 8/2005 | Shoji et al. |
| 2006/0209752 A1 | 9/2006 | Wijngaarden et al. |
| 2011/0009054 A1* | 1/2011 | Irvine et al. .................. 455/9 |
| 2011/0306384 A1 | 12/2011 | Wei |
| 2012/0220246 A1* | 8/2012 | Kushnir et al. ............ 455/118 |
| 2013/0188579 A1* | 7/2013 | Touboul et al. ............ 370/329 |
| 2015/0010115 A1* | 1/2015 | Kennard et al. ............ 375/340 |

FOREIGN PATENT DOCUMENTS

| | | |
|---|---|---|
| CN | 1787509 | 6/2006 |
| CN | 101895321 | 11/2010 |
| EP | 1 827 036 A1 | 8/2007 |
| EP | 2 251 996 A1 | 11/2010 |
| JP | 2003-283359 | 10/2003 |
| WO | 2010/118597 A1 | 10/2010 |

OTHER PUBLICATIONS

Chinese Office Action dated Jul. 2, 2014 in corresponding Chinese Patent Application No. 201280000861.9.

PCT International Search Report dated Apr. 4, 2013 in corresponding International Patent Application No. PCT/CN2012/077987.

Extended European Search Report mailed Jun. 9, 2015 for corresponding European Patent Application No. 12879623.2.

* cited by examiner

METHOD AND DEVICE FOR ADJUSTING CARRIER FREQUENCY OF MULTIPLE-INPUT MULTIPLE OUTPUT MICROWAVE DEVICE

CROSS-REFERENCE TO RELATED APPLICATIONS

This application is a continuation of International Application No. PCT/CN2012/077987, filed on Jun. 30, 2012, which is hereby incorporated by reference in its entirety.

TECHNICAL FIELD

The present invention relates to wireless communications technologies, and in particular, to a method and a device for adjusting a carrier frequency of a multiple-input multiple-output microwave device.

BACKGROUND

The multiple-input multiple-output (Multiple-Input Multiple-Out-put, MIMO) technology is a breakthrough in antenna technologies in the wireless communications field. With this technology, the capacity and reliability of a system can be improved by several times without increasing usage of time and frequency resources.

A split-type microwave device mainly includes the following parts: an antenna, an ODU (Outdoor Unit, outdoor unit), an intermediate-frequency cable, and an IDU (Indoor Unit, indoor unit). The antenna is configured to receive a carrier signal sent by the ODU and increase signal gain; the ODU is configured to perform radio frequency processing to implement signal conversion between a radio frequency and an intermediate frequency, and superpose an intermediate-frequency signal with a radio-frequency signal to form a carrier signal and send it to the antenna; the intermediate-frequency cable is configured to transmit an intermediate-frequency service signal, and a communication signal between the IDU and the ODU, and supply power to the ODU; and the IDU is configured to implement service access, service scheduling, multiplexing, modulation and demodulation and intermediate-frequency signal processing.

If the split-type device supports the multiple-input multiple-output technology, a plurality of ODUs and one IDU are required. The IDU connects to the plurality of ODUs respectively, and each ODU has an independent radio frequency-reference crystal oscillator (a local oscillator for short) and a same first frequency multiplication factor M, where M is the ratio of a transmit frequency design value of a remote radio frequency unit corresponding to the ODU to a frequency of the radio frequency-reference crystal oscillator. As a result, not only there is a deviation between a transmit carrier frequency offset and a receive carrier frequency offset of each channel, but also there is a deviation between carrier frequency offsets of different channels (carrier frequency offset for short). The carrier frequency offsets of different channels superpose at a receiver, which greatly increases the complexity of a joint frequency offset correction algorithm at the receiver, and a large carrier frequency offset may even lead to correction failure or degraded system performance.

SUMMARY

Embodiments of the present invention provide a method and a device for adjusting a carrier frequency of a multiple-input multiple-output microwave device, so as to solve the problem of carrier frequency offset between different MIMO channels in the prior art.

In a first aspect, the present invention provides a method for adjusting a carrier frequency of a multiple-input multiple-output microwave device, including:

obtaining, by an IDU, a frequency of a radio frequency-reference crystal oscillator and a first frequency multiplication factor of each ODU, where the first frequency multiplication factor is a ratio of a transmit frequency design value of a remote radio frequency unit corresponding to each ODU to the frequency of the radio frequency-reference crystal oscillator of the ODU;

selecting, by the IDU, one of the frequencies of the radio frequency-reference crystal oscillators as a reference frequency, where an ODU corresponding to the reference frequency is a reference ODU; and adjusting, by the IDU, a carrier frequency of the multiple-input multiple-output microwave device according to the first frequency multiplication factor and a radio frequency offset between the reference frequency and the frequency of the radio frequency-reference crystal oscillator of each of the other ODUs, where the other ODUs refer to all the ODUs except the reference ODU.

In another aspect, the present invention provides an apparatus for adjusting a carrier frequency of a multiple-input multiple-output microwave device, including:

an obtaining module, configured to obtain a frequency of a radio frequency-reference crystal oscillator and a first frequency multiplication factor of each ODU, where the first frequency multiplication factor is a ratio of a transmit frequency design value of a remote radio frequency unit corresponding to each ODU to the frequency of the radio frequency-reference crystal oscillator of the ODU;

a selecting module, configured to select one of the frequencies of the radio frequency-reference crystal oscillators as a reference frequency, where an ODU corresponding to the reference frequency is a reference ODU; and an adjusting module, configured to adjust a carrier frequency of the multiple-input multiple-output microwave device according to the first frequency multiplication factor and a radio frequency offset between the reference frequency and the frequency of the radio frequency-reference crystal oscillator of each of the other ODUs, where the other ODUs refer to all the ODUs except the reference ODU.

In one aspect, the present invention provides an IDU, including the apparatus for adjusting a carrier frequency of a multiple-input multiple-output microwave device described above.

In another aspect, the present invention provides a split-type microwave device, including an ODU and the IDU described above.

Based on the above technical solution, in the method and the device for adjusting a carrier frequency of a multiple-input multiple-output microwave device provided by the present invention, each ODU sends information of the frequency of the radio frequency-reference crystal oscillator back to the IDU, and the IDU adjusts the intermediate frequency according to the offset of the frequency of the radio frequency-reference crystal oscillator, thereby achieving the objective of adjusting the carrier frequency of the multiple-input multiple-output microwave device.

BRIEF DESCRIPTION OF DRAWINGS

To illustrate technical solutions in embodiments of the present invention or in the prior art more clearly, the accompanying drawings required for describing the embodiments or the prior art are briefly described in the following. Apparently, the accompanying drawings in the following description merely show some embodiments of the present invention, and persons of ordinary skill in the art may still derive other drawings from these accompanying drawings without creative efforts.

DESCRIPTION OF EMBODIMENTS

To make the objectives, technical solutions, and advantages of the embodiments of the present invention more clearly, the following clearly and completely describes the technical solutions in the embodiments of the present invention with reference to the accompanying drawings in the embodiments of the present invention. Apparently, the described embodiments are merely a part rather than all of the embodiments of the present invention. All other embodiments obtained by persons of ordinary skill in the art based on the embodiments of the present invention without creative efforts shall fall within the protection scope of the present invention.

Embodiment 1

This embodiment provides a method for adjusting a carrier frequency of a multiple-input multiple-output microwave device. Network architecture to which the method is applicable is a split-type MIMO system or a split-type XPIC (Cross-polarization Interference Cancellation, cross-polarization interference cancellation) system. Both of the two systems include a plurality of ODUs and at least one IDU. The IDU is capable of receiving an intermediate-frequency signal sent by all ODUs, adjusting the intermediate-frequency signal according to information of a frequency of a radio frequency-reference crystal oscillator sent by the ODU, and sending the adjusted intermediate-frequency signal to a corresponding ODU to finally achieving an objective of adjusting a carrier offset of a carrier signal output by each ODU. A frequency of the carrier signal=an intermediate frequency of the intermediate-frequency signal sent by the IDU to the corresponding ODU+the radio frequency of the ODU after frequency multiplication. The IDU is taken as an execution body for illustration in this embodiment.

Figure 1:
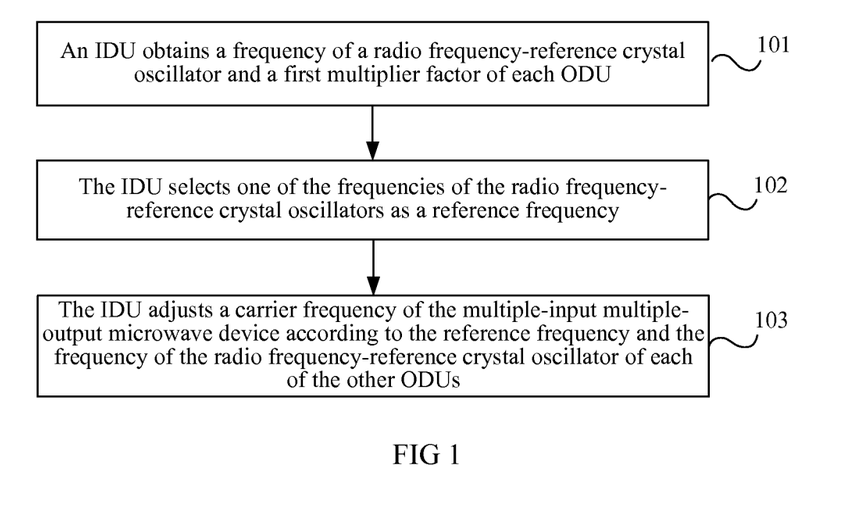
FIG. 1 is a schematic flowchart of a method for adjusting a carrier frequency of a multiple-input multiple-output microwave device according to an embodiment of the present invention.

As shown in FIG. 1, the method for adjusting a carrier frequency of a multiple-input multiple-output microwave device according to this embodiment includes:

Step 101: The IDU obtains the frequency of the radio frequency-reference crystal oscillator and a first frequency multiplication factor of each ODU, where the first frequency multiplication factor is a ratio of a transmit frequency design value of a remote radio frequency unit corresponding to the ODU to the frequency of the radio frequency-reference crystal oscillator of the ODU. In the prior art, the radio frequency of the ODU after frequency multiplication=the frequency of the radio frequency-reference crystal oscillator of the ODU× the first frequency multiplication factor M.

The step may specifically include:

manner 1: directly receiving a clock signal of the radio frequency-reference crystal oscillator and a value of the first frequency multiplication factor that are sent by the ODU and obtaining the frequency of the radio frequency-reference crystal oscillator according to the clock signal of the radio frequency-reference crystal oscillator; or, manner 2: receiving a management information carrier signal, the value of the first frequency multiplication factor, and a value of a second frequency multiplication factor that are sent by the ODU, where a frequency of the management information carrier signal=the frequency of the radio frequency-reference crystal oscillator×the second frequency multiplication factor, and the second frequency multiplication factor is a ratio of the frequency of the management information carrier signal to the frequency of the radio frequency-reference crystal oscillator; and obtaining a value of the frequency of the radio-frequency-reference crystal oscillator according to the management information carrier signal and the value of the second frequency multiplication factor; or manner 3: receiving the management information, a value of the first frequency multiplication factor, and a value of a second frequency multiplication factor that are sent by the ODU, where the management information includes a value of the frequency of the radio frequency-reference crystal oscillator after frequency multiplication, and the value of the frequency of the radio frequency-reference crystal oscillator after frequency multiplication=the frequency of the radio frequency-reference crystal oscillator×the second frequency multiplication factor;

obtaining, from a management information carrier packet through CDR, the value of the frequency of the radio frequency-reference crystal oscillator after frequency multiplication; and obtaining the value of the frequency of the radio frequency-reference crystal oscillator according to the management information and the value of the second frequency multiplication factor.

In manner 3, the management information may carry the value of the frequency of the radio frequency-reference crystal oscillator after frequency multiplication in a manner of a packet. The value of the frequency of the radio frequency-reference crystal oscillator after frequency multiplication is obtained from a corresponding field of the management information packet and a value of the required frequency of the radio frequency-reference crystal oscillator is recovered according to the second frequency multiplication factor.

In this embodiment, each ODU directly sends the clock signal of the radio frequency-reference crystal oscillator to the IDU through an intermediate-frequency cable and sends the value of the first frequency multiplication factor through a management channel; or carries the frequency of the radio frequency-reference crystal oscillator in the management information carrier signal and obtains the value of the first frequency multiplication factor and the value of the second frequency multiplication factor through the management channel (O&M channel). The IDU processes the management information carrier signal and extracts the frequency of the radio frequency-reference crystal oscillator of each ODU according to the value of the second frequency multiplication factor of the management information carrier signal. Specifically, the IDU can obtain the frequency of the management information carrier signal only by using a simple carrier extraction circuit, and then divides the frequency of the management information carrier signal by the second frequency multiplication factor to obtain the frequency of the radio frequency-reference crystal oscillator.

Of course, the management information carrier signal can also be transmitted through an additional cable, which is not limited in this embodiment.

Step 102: The IDU selects one of the frequencies of the radio frequency-reference crystal oscillators as a reference frequency, where an ODU corresponding to the reference frequency is a reference ODU.

In this step, the IDU randomly selects one of the ODUs the reference ODU and sets the frequency of the radio frequency-reference crystal oscillator of the reference ODU as the reference frequency.

Step 103: The IDU adjusts a carrier frequency of the multiple-input multiple-output microwave device according to the reference frequency and the frequency of the radio frequency-reference crystal oscillator of each of the other ODUs.

In the step, the other ODUs refer to all the ODUs except the reference ODU. For example, all the ODUs are the reference ODUs except the reference ODU. Therefore, the other ODUs represent each of the reference ODUs.

According to the method for pre-correcting the carrier frequency offset of the multiple-input multiple-output microwave device in this embodiment, the ODU sends information of the frequency of the radio frequency-reference crystal oscillator back to the IDU, and the IDU adjusts the intermediate frequency according to the offset of the frequency of the radio frequency-reference crystal oscillator, thereby achieving the objective of adjusting the carrier frequency of the multiple-input multiple-output microwave device.

Embodiment 2

Figure 1B:
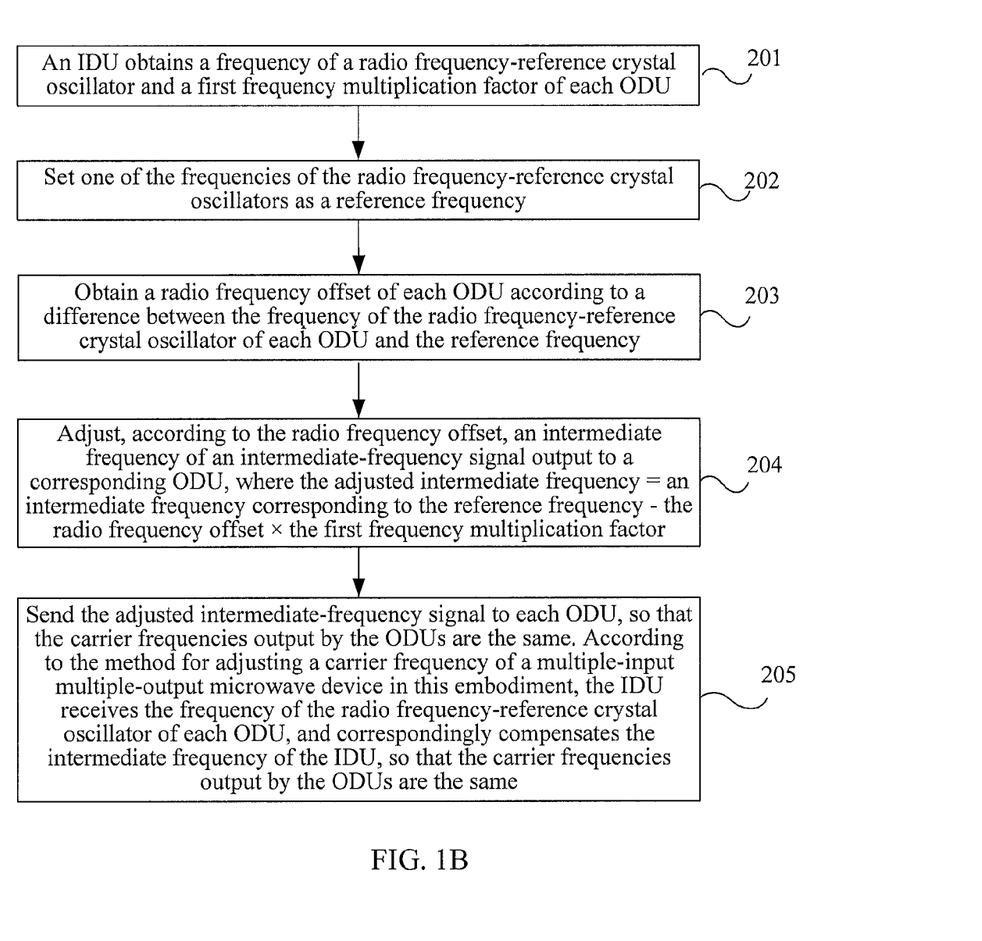
FIG. 1B is a schematic flowchart of a method for adjusting a carrier frequency of a multiple-input multiple-output microwave device according to another embodiment of the present invention.

Based on Embodiment 1, this embodiment provides a method for adjusting a carrier frequency of a multiple-input multiple-output microwave device, including:

As shown in FIG. 1B, the method for adjusting a carrier frequency of a multiple-input multiple-output microwave device according to this embodiment includes:

Step 201: An IDU obtains a frequency of a radio frequency-reference crystal oscillator and a first frequency multiplication factor of each ODU.

Specific implementation manners of this step may be the same as that of Embodiment 1. For example, the IDU may directly receive a clock signal of the radio frequency-reference crystal oscillator and the first frequency multiplication factor that are sent by the ODU and may directly obtain the frequency of the radio frequency-reference crystal oscillator according to the clock signal of the radio frequency-reference crystal oscillator. The implementation manner may also be that the ODU directly generates a management information carrier by using the radio frequency-reference crystal oscillator, and then the IDU extracts and recovers the ODU clock signal from the management information carrier. Specifically, the management information carrier is $f_n \times N$. In this way, the IDU processes the management information carrier according to a pre-obtained N, and then the IDU may obtain the frequency $f_n$ of the radio frequency-reference crystal oscillator.

Step 202: Set one of the frequencies of the radio frequency-reference crystal oscillators as a reference frequency.

The IDU randomly selects one of the frequencies of the radio frequency-reference crystal oscillators as the reference frequency, and an ODU corresponding to the reference frequency is a reference ODU.

Step 203: Obtain a radio frequency offset of each ODU according to a difference between the frequency of the radio frequency-reference crystal oscillator of each ODU and the reference frequency.

The IDU compares the frequency of the radio frequency-reference crystal oscillator of each ODU with the reference frequency, and therefore obtains the radio frequency offset between other ODUs and the reference ODU. That is, the radio frequency offset=the frequency of the radio frequency-reference crystal oscillator of the ODU−the reference frequency.

Step 204: Adjust, according to the radio frequency offset, an intermediate frequency of an intermediate-frequency signal output to a corresponding ODU, where the adjusted intermediate frequency=an intermediate frequency corresponding to the reference frequency−the radio frequency offset×the first frequency multiplication factor.

Because the carrier frequency of the carrier signal sent by each ODU=the intermediate frequency of the intermediate-frequency signal sent by the IDU+the radio frequency of the ODU, and the radio frequency of the ODU=the frequency of the radio frequency-reference crystal oscillator of the ODU× the first frequency multiplication factor, the ultimate carrier frequency can be adjusted by adjusting the intermediate frequency of the intermediate-frequency signal sent by the IDU.

Step 204 specifically may include:

adjusting the intermediate frequency of each intermediate-frequency signal by using a frequency offset correction phase-locked loop according to each radio frequency offset between the reference frequency and the frequency of the radio frequency-reference crystal oscillator of each ODU; and when a difference between the intermediate frequency and a reference intermediate frequency corresponding to the reference frequency equals the product of the radio frequency offset and the first frequency multiplication factor, locking the frequency offset correction phase-locked loop.

Step 205: Send the adjusted intermediate-frequency signal to each ODU, so that the carrier frequencies output by the ODUs are the same. According to the method for adjusting a carrier frequency of a multiple-input multiple-output microwave device in this embodiment, the IDU receives the frequency of the radio frequency-reference crystal oscillator of each ODU, and correspondingly compensates the intermediate frequency of the IDU, so that the carrier frequencies output by the ODUs are the same.

Embodiment 3

Figure 2A:
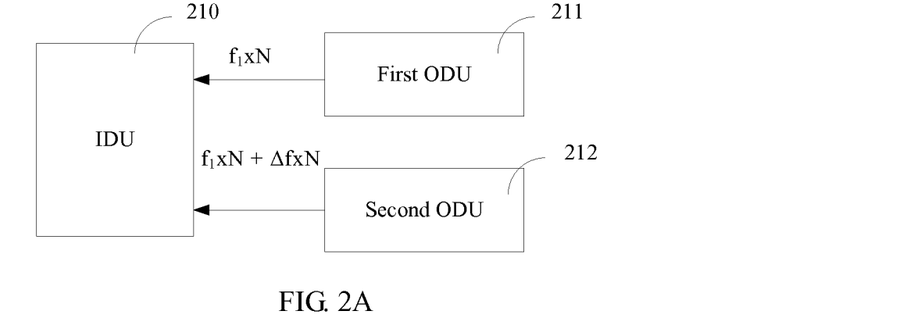
FIG. 2A is a schematic diagram of a principle of a method for adjusting a carrier frequency of a multiple-input multiple-output microwave device according to an embodiment of the present invention.

Based on the foregoing embodiment, this embodiment further illustrates the method for adjusting a carrier frequency of a multiple-input multiple-output microwave device with specific examples. In actual operation, the number of ODUs may be changed according to the actual requirement, such as 5, 10, or even 20. This embodiment uses two ODUs as an example for illustration, as shown in FIG. 2A.

Figure 1C:
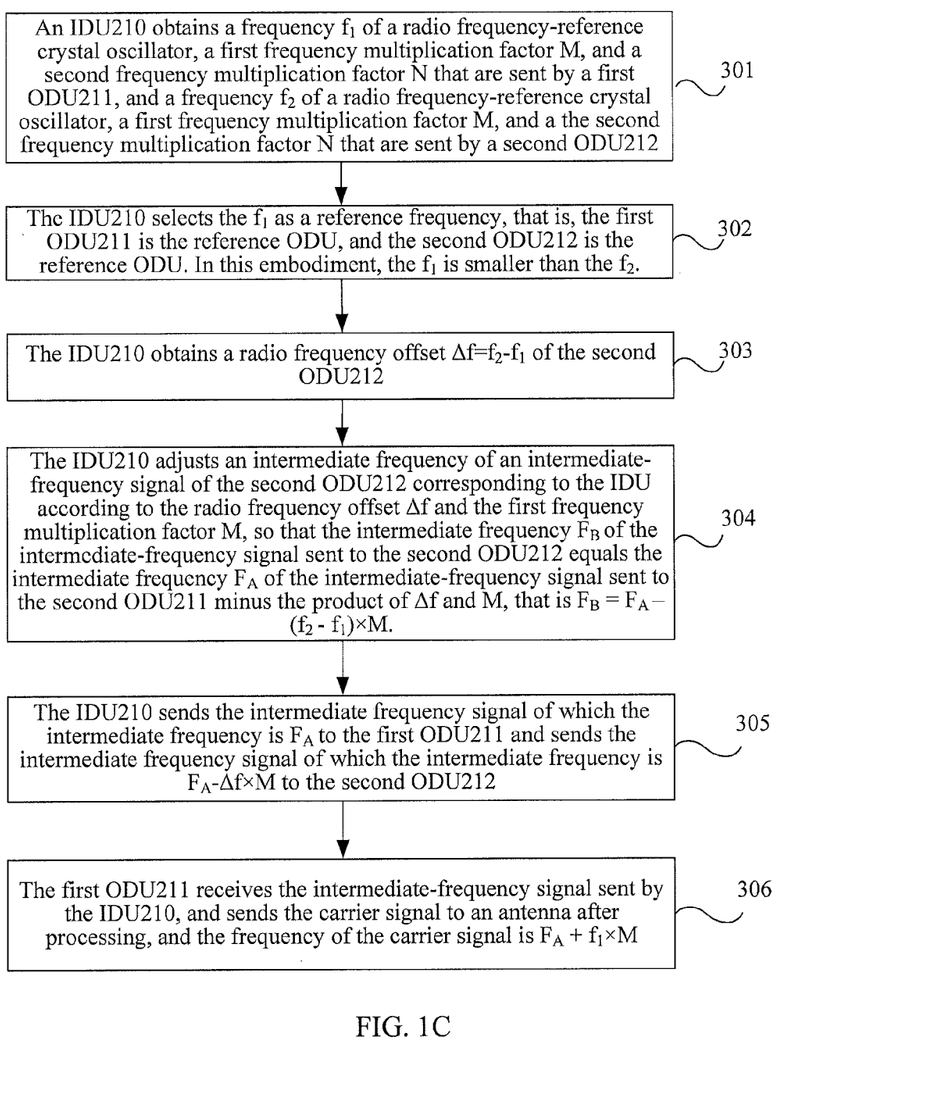
FIG. 1C is a schematic flowchart of a method for adjusting a carrier frequency of a multiple-input multiple-output microwave device according to still another embodiment of the present invention.

As shown in FIG. 1C, the method for adjusting a carrier frequency of a multiple-input multiple-output microwave device according to this embodiment includes:

Step 301: An IDU210 obtains a frequency $f_1$ of a radio frequency-reference crystal oscillator, a first frequency multiplication factor M, and a second frequency multiplication factor N that are sent by a first ODU211, and a frequency $f_2$ of a radio frequency-reference crystal oscillator, a first frequency multiplication factor M, and a the second frequency multiplication factor N that are sent by a second ODU212.

This embodiment takes an example where the first frequency multiplication factor M and the second frequency multiplication factor N of the two ODUs are equal for illustration. FIG. 2A shows frequency information sent by using a management information carrier signal. As shown in the figure, a frequency of a first management information carrier signal is $f_1 \times N$, and a frequency of a second management information carrier signal is $f_2 \times N$.

Step 302: The IDU210 selects the $f_1$ as a reference frequency, that is, the first ODU211 is the reference ODU, and the second ODU212 is the reference ODU. In this embodiment, the $f_1$ is smaller than the $f_2$.

Step 303: The IDU210 obtains a radio frequency offset $\Delta f = f_2 - f_1$ of the second ODU212.

Step 304: The IDU210 adjusts an intermediate frequency of an intermediate-frequency signal of the second ODU212 corresponding to the IDU according to the radio frequency offset $\Delta f$ and the first frequency multiplication factor M, so that the intermediate frequency $F_B$ of the intermediate-frequency signal sent to the second ODU212 equals the intermediate frequency $F_A$ of the intermediate-frequency signal sent to the second ODU211 minus the product of $\Delta f$ and M, that is $F_B = F_A - (f_2 - f_1) \times M$.

This step specifically may be implemented through DDS (Direct Digital Frequency Synthesis, direct digital frequency synthesis). The DDS is an apparatus which can generate any frequency by setting a frequency tuning word (FTW). Specifically, the DDS uses a SIN (sine) searching table and a DAC (Digital-to-Analog Converter, digital-to-analog converter) to perform control. The DDS firstly sends the frequency tuning word to a phase accumulator for accumulation, obtains, through the SIN searching table, a quantitative value of amplitude to be output, and then enters the quantitative value of the amplitude into the DAC to convert the quantitative value to analog amplitude of the frequency. A cycle is performed in this way and the DDS generates a waveform of the required frequency signal. In this embodiment, the DDS is applied in the phase-locked loop, as shown in the FIG. 2B, which is a working principle diagram of a frequency offset correction circuit applied to the phase-locked loop in this embodiment.

Figure 2B:
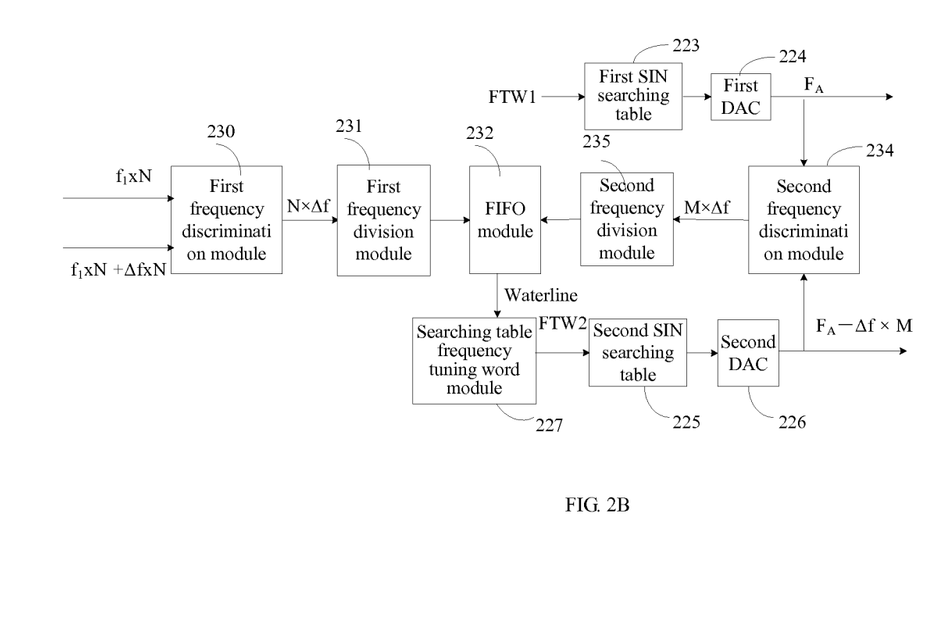
FIG. 2B is a schematic diagram of a working principle of a frequency offset correction phase-locked loop of an IDU according to an embodiment of the present invention.

A first frequency discrimination module 230 in the frequency offset correction circuit of the IDU210 receives the first management information carrier signal $f1 \times N$ sent by the first ODU211 (not shown in the figure) and receives the second management information carrier signal $f2 \times N$, that is, $f1 \times N + \Delta f \times N$, sent by the second ODU212 (not shown in the figure). The first frequency discrimination module 230 obtains the radio frequency offset $\Delta f \times N$ after frequency multiplication and a first frequency division module 231 obtains the radio frequency offset $\Delta f$. The first frequency division module 231 is configured to receive the second frequency multiplication factor N sent by the ODU, perform frequency division on the radio frequency offset after frequency multiplication, and send the radio frequency offset $\Delta f$ to an FIFO module 232 as a write clock signal.

A second frequency discrimination module 234 is configured to obtain an intermediate frequency corresponding to the first ODU211 and an intermediate frequency corresponding to the second ODU212 that are output by the DDS, obtain a difference between the two, and send the difference to a second frequency division module 235. The second frequency division module 235 receives the first frequency multiplication factor M sent by the two ODUs, performs frequency division on the difference sent by the second frequency discrimination module 234, and then sends the difference after frequency division to the FIFO module 232 as the write clock signal.

In this embodiment, the IDU210 sets a frequency tuning word FTW1 corresponding to the first ODU211 to be equal to a frequency tuning word FTW2 corresponding to the second ODU212, that is, FTW1=FTW2, and the intermediate frequency of the intermediate-frequency signal sent to the first ODU211 equals the intermediate frequency of the intermediate-frequency signal sent to the second ODU212. After the frequency tuning word is set, an intermediate frequency $F_A$ which is input into the second frequency discrimination module 234 and corresponds to the first ODU is obtained through a first SIN searching table 223 and a first DAC224. The intermediate frequency $F_A$ is the reference frequency. An intermediate frequency which corresponds to the second ODU212 and is input into the second frequency discrimination module 234 through a second SIN searching table 225 and a second DAC226 is also $F_A$. Based on the above, data is consistently written into the FIFO module 232. However, the FIFO module 232 cannot read the data because the intermediate frequency of the first ODU211 and that of the second ODU212 are equal, that is, a waterline of the FIFO module is elevated. The FTW2 is adjusted by using a searching table frequency tuning word module 227, and the intermediate frequency of the intermediate-frequency signal sent to the second ODU212 is decreased. In this case, the FIFO module 232 starts to read the data. Afterward, the searching table frequency tuning word module 227 consistently decreases the FTW2, for example, the searching table frequency tuning word module 227 decreases the FTW2 by a preset step length until the waterline is kept to a constant value when the FIFO module 232 reads data and writes data at the same speed. In this case, the entire loop is locked and the FTW2 does not change any more. The difference between the intermediate frequency of the first ODU211 and that of the second ODU212 is $\Delta f \times M$. That is, the intermediate frequency corresponding to the first ODU211 is the $F_A$, and the intermediate frequency corresponding to the second ODU212 is $F_A - \Delta f \times M$.

Step 305: The IDU210 sends the intermediate frequency signal of which the intermediate frequency is $F_A$ to the first ODU211 and sends the intermediate frequency signal of which the intermediate frequency is $F_A - \Delta f \times M$ to the second ODU212.

Step 306: The first ODU211 receives the intermediate-frequency signal sent by the IDU210, and sends the carrier signal to an antenna after processing, and the frequency of the carrier signal is $F_A + f_1 \times M$.

The second ODU212 receives the intermediate frequency-signal sent by the IDU210, and sends the carrier signal to the antenna after processing, and the frequency of the carrier signal is $FA - \Delta f \times M + f2 \times M = FA - (f2-f1) \times M + f2 \times M = FA + f1 \times M$, It can be seen that, the carrier frequency of the first ODU211 completely equals the carrier frequency of the second ODU212. The IDU210 adjusts the carrier frequency of the ultimate carrier signal through the information of the radio frequency signals sent by the first ODU211 and the second ODU212 and by adjusting the intermediate frequency of the intermediate-frequency signal of the IDU210, so that the carrier frequency offsets of the carrier signals are consistent with each other.

Persons of ordinary skill in the art may understand that, all or a part of the steps of the methods in the embodiments may be implemented by a program instructing relevant hardware. The foregoing program may be stored in a computer readable storage medium. When the program runs, the preceding steps in the method embodiments are performed; the foregoing storage medium may be any medium capable of storing program codes, such as a ROM, a RAM, a magnetic disk, or an optical disk.

Embodiment 4

This embodiment provides an IDU for implementing the method for adjusting a carrier frequency of a multiple-input multiple-output microwave device described in the foregoing embodiment.

Figure 3:
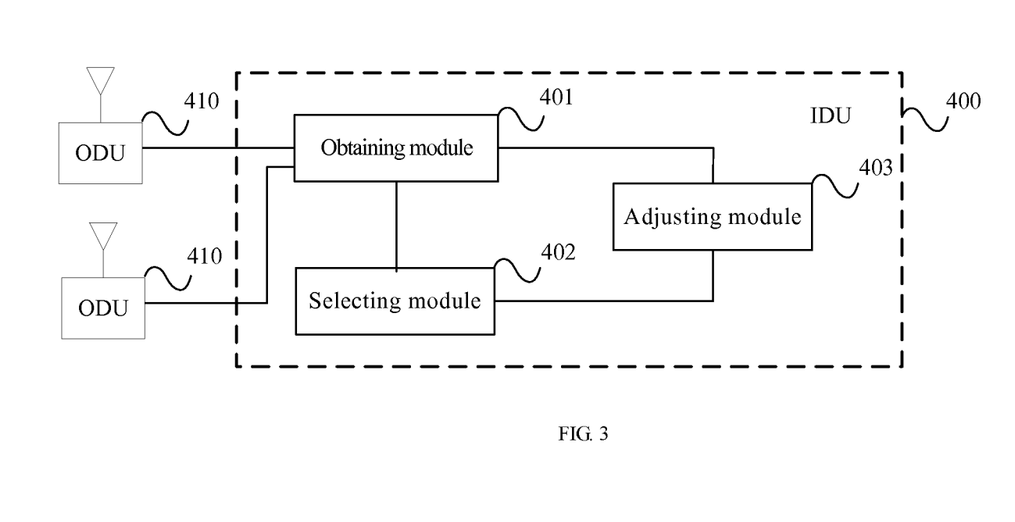
FIG. 3 is a schematic structural diagram of an IDU according to another embodiment of the present invention.

FIG. 3 is a schematic structural diagram of an IDU according to this embodiment. The IDU400 includes an obtaining module 401, a selecting module 402, and an adjusting module 403.

The obtaining module 401 is configured to obtain a frequency of a radio frequency-reference crystal oscillator of each ODU 410 and a first frequency multiplication factor, where the first frequency multiplication factor is a ratio of a transmit frequency design value of a remote radio frequency unit corresponding to the ODU410 to the frequency of the radio frequency-reference crystal oscillator of the ODU. The selecting module 402 is connected to the obtaining module 401 and is configured to select one of the frequencies of the radio frequency-reference crystal oscillators as a reference frequency, and an ODU corresponding to the reference frequency is a reference frequency. The adjusting module 403 is respectively connected to the obtaining module 401 and the selecting module 402 and is configured to adjust a carrier frequency of the multiple-input multiple-output microwave device according to the first frequency multiplication factor and difference radio frequency offset between the reference frequency and the frequency of the radio frequency-reference crystal oscillator of each of the other ODUs410, where the other ODUs refer to all the ODUs except the reference ODU, and the detailed explanations are the same as those in the foregoing embodiment, which will not be described herein again. FIG. 3 uses two ODUs as an example for processing. The number of ODUs specifically may be three, four, or more.

A specific operation method of the IDU400 is the same as that in Embodiment 1, which will not be described herein again.

According to the IDU400 this embodiment, each ODU410 sends information of the frequency of the radio frequency-reference crystal oscillator to the IDU400, and then the IDU400 adjusts the intermediate frequency according to the offset of the frequency of the radio frequency-reference crystal oscillator, thereby achieving the objective of adjusting the carrier frequency of the multiple-input multiple-output microwave device.

Embodiment 5

This embodiment further illustrates the IDU in Embodiment 4.

Figure 4:
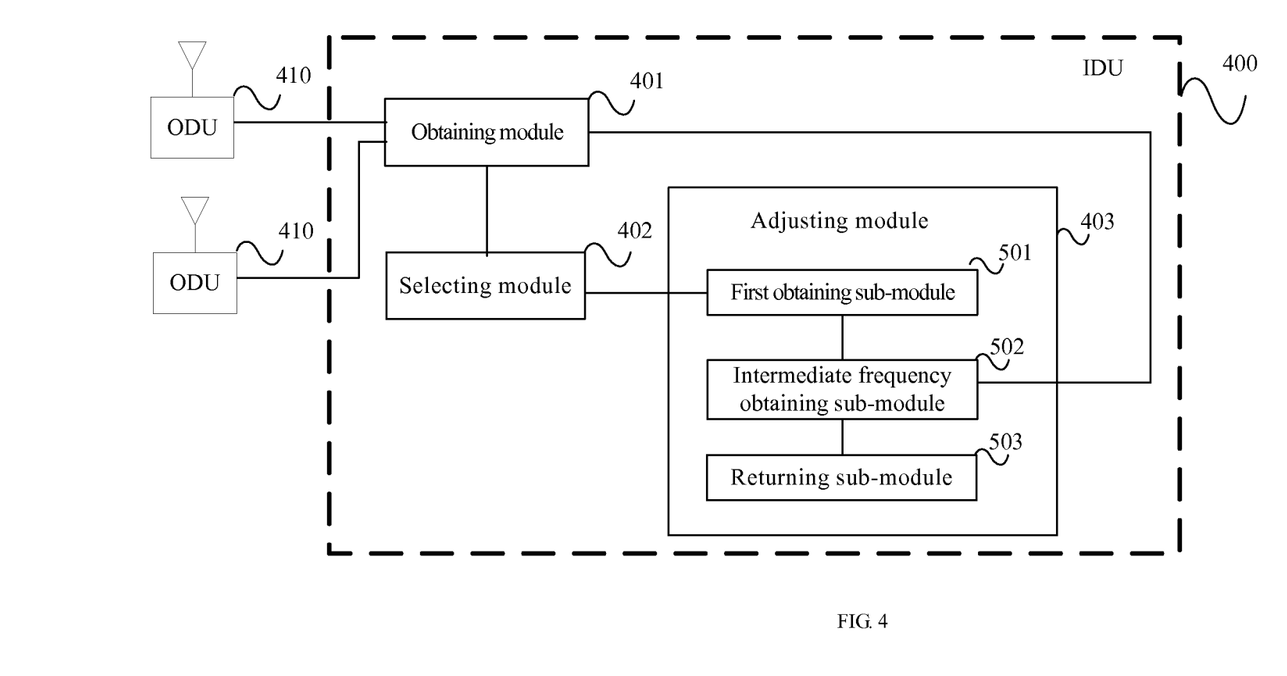
FIG. 4 is a schematic structural diagram of an IDU according to still another embodiment of the present invention.

As shown in FIG. 4, the adjusting module 403 of IDU400 in this embodiment includes a first obtaining sub-module 501, an intermediate frequency obtaining sub-module 502, and a returning sub-module 503. The first obtaining sub-module 501 is connected to a selecting module 402 and is configured to obtain a radio frequency offset of each ODU 410 according to a difference between the frequency of the radio frequency-reference crystal oscillator of the ODU410 and the reference frequency. The intermediate frequency obtaining sub-module 502 is respectively connected to the first obtaining sub-module 501 and the obtaining module 401 and is configured to adjust, according to the radio frequency offset, an intermediate frequency of an intermediate-frequency signal output to a corresponding ODU410, where the intermediate frequency=an intermediate frequency corresponding to the reference frequency−the radio frequency offset×the first frequency multiplication factor. The returning sub-module 503 is connected to the intermediate frequency obtaining sub-module 502 and is configured to send a corresponding intermediate-frequency signal to each ODU, so the carrier signal frequencies output by the ODUs are equal.

More specifically, the intermediate frequency obtaining sub-module 502 is configured to:

adjust the intermediate frequency of each intermediate-frequency signal by using a frequency offset correction phase-locked loop according to each radio frequency offset between the reference frequency and the frequency of the radio frequency-reference crystal oscillator of each ODU; and when a difference between the intermediate frequency and a reference intermediate frequency corresponding to the reference frequency equals the product of the radio frequency offset and the first frequency multiplication factor, lock the frequency offset correction phase-locked loop.

The specific implementation manner for the foregoing frequency offset correction phase-locked loop is shown in FIG. 2B, and the working principle is the same as that in Embodiment 3, which will not be described herein again.

The obtaining module 401 is specifically configured to:

directly receive a clock signal of the radio frequency-reference crystal oscillator and the first frequency multiplication factor that are sent by the ODU and obtain the frequency of the radio frequency-reference crystal oscillator according to the clock signal of the radio frequency-reference crystal oscillator; or, receive a management information carrier signal, a value of the first frequency multiplication factor, and a value of the second frequency multiplication factor that are sent by the ODU, where a frequency of the management information carrier signal=the frequency of the radio frequency-reference crystal oscillator×the second frequency multiplication factor, and the second frequency multiplication factor is a ratio of the frequency of the management information carrier signal to the frequency of the radio frequency-reference crystal oscillator, and obtain a value of the frequency of the radio frequency-reference crystal oscillator according to the management information carrier signal and the value of the second frequency multiplication factor; or, receive management information, a value of the first frequency multiplication factor, and a value of the second frequency multiplication factor that are sent by the ODU, where the management information includes a value of the frequency of the radio frequency-reference crystal oscillator after frequency multiplication, and the value of the frequency of the radio frequency-reference crystal oscillator after the frequency multiplication=the frequency of the radio frequency-reference crystal oscillator×the second frequency multiplication factor; obtain, from a management information carrier packet through CDR, the value of the frequency of the radio frequency-reference crystal oscillator after frequency multiplication; and obtain the value of the frequency of the radio frequency-reference crystal oscillator according to the management information and the value of the second frequency multiplication factor.

The specific operation manner of IDU 400 is the same as the method for adjusting the carrier frequency of the multiple-input multiple-output microwave device, which will not be described herein again.

The IDU 400 receives the frequency of the radio frequency-reference crystal oscillators of each ODU 410 and correspondingly compensates the intermediate frequency of the IDU, so that the carrier frequencies output by each ODU 410 are equal.

The present invention also provides a split-type microwave device, including the ODU and the IDU described in any of the preceding embodiments.

Finally, it should be noted that the above embodiments are merely intended for describing the technical solutions of the present invention rather than limiting the present invention. Although the present invention is described in detail with reference to the foregoing embodiments, persons of ordinary skill in the art should understood that they may still make modifications to the technical solutions described in the foregoing embodiments, or make equivalent substitutions to some technical features thereof, without departing from the scope of the technical solutions of the embodiments of the present invention.

What is claimed is:

1. A method for adjusting a carrier frequency of a multiple-input multiple-output microwave device, comprising:
    obtaining, by an indoor unit (IDU), a frequency of a radio frequency-reference crystal oscillator and a first frequency multiplication factor of each outdoor unit (ODU), wherein the first frequency multiplication factor is a ratio of a transmit frequency design value of a remote radio frequency unit corresponding to each ODU to the frequency of the radio frequency-reference crystal oscillator of the ODU;
    selecting, by the IDU, one of the frequencies of the radio frequency-reference crystal oscillators as a reference frequency, wherein an ODU corresponding to the reference frequency is a reference ODU; and
    adjusting, by the IDU, a carrier frequency of the multiple-input multiple-output microwave device according to the first frequency multiplication factor and a radio frequency offset between the reference frequency and the frequency of the radio frequency-reference crystal oscillator of each of the other ODUs, wherein the other ODUs refer to all the ODUs except the reference ODU.

2. The method for adjusting a carrier frequency of a multiple-input multiple-output microwave device according to claim 1, wherein the adjusting the carrier frequency of the multiple-input multiple-output microwave device according to the first frequency multiplication factor and the radio frequency offset between the reference frequency and the frequency of the radio frequency-reference crystal oscillator of each of the other ODUs comprises:
    obtaining a radio frequency offset of each ODU according to a difference between the frequency of the radio frequency-reference crystal oscillator of the ODU and the reference frequency;
    adjusting, according to the radio frequency offset, an intermediate frequency of an intermediate-frequency signal output to a corresponding ODU, wherein the adjusted intermediate frequency=an intermediate frequency corresponding to the reference frequency−the radio frequency offset×the first frequency multiplication factor; and
    sending the adjusted intermediate-frequency signal to each ODU, so that carrier frequencies output by the ODUs are the same.

3. The method for adjusting a carrier frequency of a multiple-input multiple-output microwave device according to claim 2, wherein the adjusting, according to the radio frequency offset, the intermediate frequency of the intermediate-frequency signal output to the corresponding ODU, wherein the adjusted intermediate frequency=the intermediate frequency corresponding to the reference frequency−the radio frequency offset×the first frequency multiplication factor comprises:
    adjusting the intermediate frequency of each intermediate-frequency signal by using a frequency offset correction phase-locked loop according to each radio frequency offset between the reference frequency and the frequency of the radio frequency-reference crystal oscillator of each ODU; and
    when a difference between the intermediate frequency and a reference intermediate frequency corresponding to the reference frequency equals a product of the radio frequency offset and the first frequency multiplication factor, locking the frequency offset correction phase-locked loop.

4. The method for adjusting a carrier frequency of a multiple-input multiple-output microwave device according to claim 1, wherein the obtaining the frequency of the radio frequency-reference crystal oscillator and the first frequency multiplication factor of each ODU comprises:
    directly receiving a clock signal of the radio frequency-reference crystal oscillator and a value of the first frequency multiplication factor that are sent by the ODU and obtaining the frequency of the radio frequency-reference crystal oscillator according to the clock signal of the radio frequency-reference crystal oscillator; or,
    receiving a management information carrier signal, a value of the first frequency multiplication factor, and a value of a second frequency multiplication factor that are sent by the ODU, wherein a frequency of the management information carrier signal=the frequency of the radio frequency-reference crystal oscillator×the second frequency multiplication factor, and the second frequency multiplication factor is a ratio of the frequency of the management information carrier signal to the frequency of the radio frequency-reference crystal oscillator, and obtaining a value of the frequency of the radio frequency-reference crystal oscillator according to the management information carrier signal and the value of the second frequency multiplication factor; or
    receiving management information, a value of the first frequency multiplication factor, and a value of a second frequency multiplication factor that are sent by the ODU, wherein the management information comprises a value of the frequency of the radio frequency-reference crystal oscillator after frequency multiplication, and the value of the frequency of the radio frequency-reference crystal oscillator after frequency multiplication=the frequency of the radio frequency-reference crystal oscillator×the second frequency multiplication factor,
    obtaining, from a management information carrier packet through Clock Data Recovery (CDR), the value of the frequency of the radio frequency-reference crystal oscillator after frequency multiplication, and obtaining the value of the frequency of the radio frequency-reference crystal oscillator according to the management information and the value of the second frequency multiplication factor.

5. An apparatus for adjusting a carrier frequency of a multiple-input multiple-output microwave device, comprising:
   an obtaining module, configured to obtain a frequency of a radio frequency-reference crystal oscillator and a first frequency multiplication factor of each outdoor unit (ODU), wherein the first frequency multiplication factor is a ratio of a transmit frequency design value of a remote radio frequency unit corresponding to each ODU to the frequency of the radio frequency-reference crystal oscillator of the ODU;
   a selecting module, configured to select one of the frequencies of the radio frequency-reference crystal oscillators as a reference frequency, wherein an ODU corresponding to the reference frequency is a reference ODU; and
   an adjusting module, configured to adjust a carrier frequency of the multiple-input multiple-output microwave device according to the first frequency multiplication factor and a radio frequency offset between the reference frequency and the frequency of the radio frequency-reference crystal oscillator of each of the other ODUs, wherein the other ODUs refer to all the ODUs except the reference ODU.

6. The apparatus for adjusting a carrier frequency of a multiple-input multiple-output microwave device according to claim 5, wherein the adjusting module comprises:
   a first obtaining sub-module, configured to obtain a radio frequency offset of each ODU according to a difference between the frequency of the radio frequency-reference crystal oscillator of the ODU and the reference frequency;
   an intermediate frequency obtaining sub-module, configured to adjust, according to the radio frequency offset, an intermediate frequency of an intermediate-frequency signal output to a corresponding ODU, wherein the adjusted intermediate frequency=an intermediate frequency corresponding to the reference frequency−the radio frequency offset×the first frequency multiplication factor; and
   a returning sub-module, configured to send the adjusted intermediate-frequency signal to each ODU, so that carrier frequencies output by the ODUs are the same.

7. The apparatus for adjusting a carrier frequency of a multiple-input multiple-output microwave device according to claim 6, wherein the intermediate frequency obtaining sub-module is configured to:
   adjust the intermediate frequency of each intermediate-frequency signal by using a frequency offset correction phase-locked loop according to each radio frequency offset between the reference frequency and the frequency of the radio frequency-reference crystal oscillator of each ODU; and
   when a difference between the intermediate frequency and a reference intermediate frequency corresponding to the reference frequency equals a product of the radio frequency offset and the first frequency multiplication factor, lock the frequency offset correction phase-locked loop.

8. The apparatus for adjusting a carrier frequency of a multiple-input multiple-output microwave device according to claim 5, wherein the obtaining module is configured to:
   directly receive a clock signal of the radio frequency-reference crystal oscillator and a value of the first frequency multiplication factor that are sent by the ODU and obtain the frequency of the radio frequency-reference crystal oscillator according to the clock signal of the radio frequency-reference crystal oscillator; or
   receive a management information carrier signal, a value of the first frequency multiplication factor, and a value of a second frequency multiplication factor that are sent by the ODU, wherein a frequency of the management information carrier signal=the frequency of the radio frequency-reference crystal oscillator×the second frequency multiplication factor, and the second frequency multiplication factor is a ratio of the frequency of the management information carrier signal to the frequency of the radio frequency-reference crystal oscillator, and obtain a value of the frequency of the radio frequency-reference crystal oscillator according to the management information carrier signal and the value of the second frequency multiplication factor; or,
   receive management information, a value of the first frequency multiplication factor, and a value of a second frequency multiplication factor that are sent by the ODU, wherein the management information comprises a value of the frequency of the radio frequency-reference crystal oscillator after frequency multiplication, and the value of the frequency of the radio frequency-reference crystal oscillator after frequency multiplication=the frequency of the radio frequency-reference crystal oscillator×the second frequency multiplication factor,
   obtain, from a management information carrier packet through Clock Data Recovery (CDR), the value of the frequency of the radio frequency-reference crystal oscillator after frequency multiplication, and
   obtain the value of the frequency of the radio frequency-reference crystal oscillator according to the management information and the value of the second frequency multiplication factor.

9. An indoor unit (IDU), comprising the apparatus for adjusting a carrier frequency of a multiple-input multiple-output microwave device according to claim 5.

* * * * *